Patented Jan. 23, 1923.

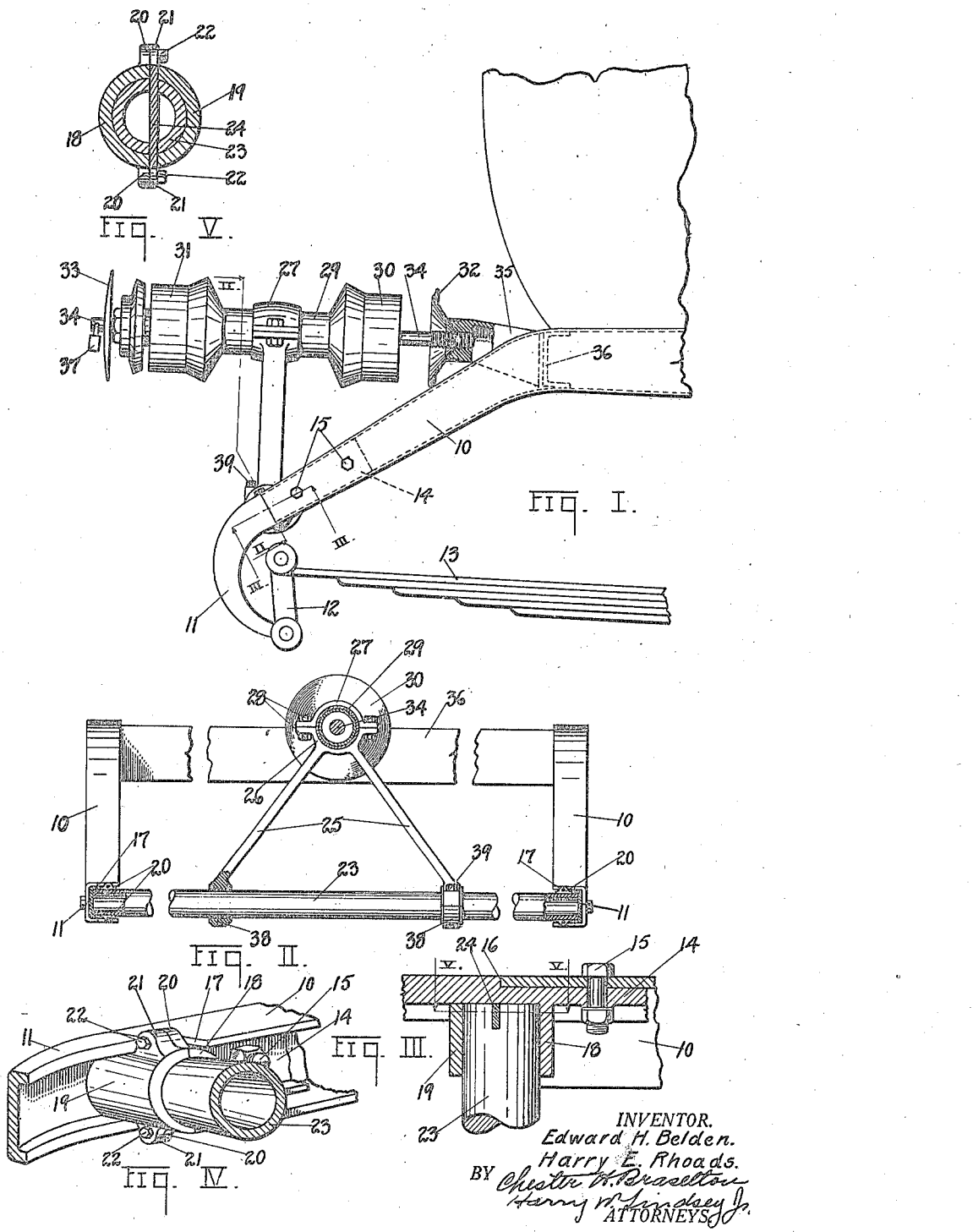

1,442,996

UNITED STATES PATENT OFFICE.

EDWARD H. BELDEN AND HARRY E. RHOADS, OF TOLEDO, OHIO, ASSIGNORS, BY MESNE ASSIGNMENTS, TO THE WILLYS-OVERLAND COMPANY, OF TOLEDO, OHIO, A CORPORATION OF OHIO.

WHEEL-SUPPORTING FRAME STRUCTURE.

Original application filed June 4, 1917, Serial No. 172,720. Divided and this application filed September 7, 1920. Serial No. 408,681.

*To all whom it may concern:*

Be it known that we, EDWARD H. BELDEN and HARRY E. RHOADS, residing at Toledo, county of Lucas, State of Ohio, have invented certain new and useful Improvements in Wheel-Supporting Frame Structures, of which we declare the following to be a full, clear, and exact description.

The invention relates to a wheel supporting frame structure and the present application constitutes a division of our co-pending applications bearing Serial Nos. 172,720 and 183,497, filed June 4, 1917, and July 30, 1917, respectively.

The invention has for its object to provide an improved construction for supporting spare wheels and the like and serves also to afford suitable means for bracing the side frame members of an automobile or other type of vehicle.

A further object of the invention is to provide an improved wheel carrier and support therefor which are removably connected with the side frame members of a vehicle.
A further object of the invention is to provide an improved frame construction, certain parts of which are adapted to support a carrier for wheels and the like.

Another object of the invention is to provide a frame brace and wheel carrier combined in such a manner as to be removable as a unit from the frame.

Another object of the invention is to provide extensions upon the side frame members of a vehicle for supporting the springs of the vehicle with an improved wheel carrier support disposed between and removably connected with said extensions and frame members.

Another object of the invention is to provide a removable brace bar between the rear ends of the side frame members of an automobile with a wheel carrier pivoted thereon and adapted to be swung in a vertical plane to permit of the application of a pair of wheels on the opposite sides of the carrier, with means provided for locking and retaining the carrier in upright position.

A further object of the invention is to provide in a vehicle frame structure, a pair of transverse connecting or brace members, one of which is removable, in combination with a wheel carrier mounted thereon and removably connected with the other of said transverse members.

Another object of the invention is to provide upon the rear of a vehicle frame a removable bar adapted to support a wheel or tire carrier of any preferred construction which may be removed with said bar as a unit.

A still further object of the invention is to provide an improved wheel carrier and frame brace of few parts which are simple in construction and which can be manufactured and assembled at a relatively low cost.

With these and other objects in view, the invention comprises certain novel features of construction and arrangement of parts which will be hereinafter more fully pointed out and claimed, it being understood that the construction is susceptible to various modifications and changes in the detail forms of application without departing from the spirit of the invention as expressed in the claims.

A construction constituting one embodiment of the invention is illustrated in the accompanying drawing in which:

Figure I is a side elevaton of a wheel carrier and frame structure embodying the invention.

Figure II is a transverse sectional elevation taken on line II—II of Figure I.

Figure III is a detailed sectional plan taken on line III—III of Figure I.

Figure IV is a perspective view illustrating the manner of connecting the removable brace bar with the side frame members and extension thereof and

Figure V is a detailed section taken on line V—V of Fig. III.

Like reference characters throughout the several views of the drawing indicate corresponding parts.

The structure illustrated in the drawing comprises the side frame channels 10 of a vehicle frame which are provided at their rear ends with extensions 11 curved downwardly and forwardly to receive the links 12 with the upper ends of which are connected the rear ends of the springs 13 as shown in Figure I. The extensions 11 are provided with forwardly extending portions 14 which lie within and are secured to the side frame channels 10 by means of the bolts 15 as indicated in Figures I, III and IV, said extensions being also provided with shoulders or abutments 16 against which the extreme ends of the channels 10 are adapted to bear as indicated in Figure III. The inturned flanges of the extensions 11 are of less width than the flanges of the channel 10 and at the point of connection of the extension with the channel 10, the flanges of the latter are preferably cut away as indicated at 17 so that they are reduced at this point to a width substantially equal to the width of the flanges of said extensions. Projecting inwardly and laterally from the web of the extension 11 is a half round socket portion 18 preferably cast integral with the extension and associated therewith to form a complete socket is a removable portion 19, said half round portions 18 and 19 being provided respectively with laterally extending lugs 20 and 21 which are preferably connected by means of the bolts 22 as indicated in Figures IV and V. The socket or bracket members 18 and 19 when connected together as shown constitute a complete socket, preferably of cylindrical form which is adapted to receive the ends of the tubular brace bar and wheel supporting member 23 as best indicated in Figure III. In order to prevent the turning of the combined brace bar and wheel support 23 within the socket members, a key 24 is placed in the end of the bar with its ends projecting laterally therefrom, said ends being disposed within recesses formed within the removable portion 19 of the socket as indicated in Figure V. Displacement of the key is prevented by the inturned flanges of the extension 11 between which the inner ends of the half round portions 18 and 19 project as indicated in Figures III and IV. It will be seen from this construction that by unscrewing the bolt 22 and removing the half round portion 19 of the socket that the combined brace bar and wheel support 23 may be moved rearwardly between the flanges of the extensions 11 which preferably taper outwardly so that the brace bar may be more easily removed from between the extensions when moved rearwardly a predetermined distance, it being understood also that the rear ends of the side frame channels are inclined outwardly and therefore the play between the ends of bar and locks of the channel increases as the bar is moved rearwardly, whereby the distance between the flanges of the extensions is also increased to better facilitate the removal of the bar. Mounted upon the removable bar 23 is a wheel support comprising the inwardly converging upright portions 25 which are preferably integrally connected by a half round bearing portion 26 upon which is superimposed a removable cap 27 connected with a lower portion of the bearing by means of the bolts 28 as shown in Figure II. Clamped within the bearing formed by said portions 26 and 27 is a horizontally disposed tubular member 29 provided with the front and rear hub receiving portions 30 and 31 respectively for carrying a pair of spare wheels, which are retained in proper position by having the outer extremities of their hubs held in contact with the plate members 32 and 33, the latter of which is mounted upon a removable rod 34 extending through the cylindrical portion 29 and screwed into the bracket 35 secured upon and extending rearwardly from the transverse tie member 36 as indicated in Figure I. The bracket 35 also forms a suitable support for the disc 32 which may be connected therewith in any preferred manner. The disc 33 is held against displacement upon the rod 34 preferably by means of the lock 37 shown at the extreme left of Figure I. The transverse member 36 is preferably in the form of a channel and constitutes a permanent connection between the side frame channels 10 while the removable bar 23 upon which the wheel support is pivotally mounted serves to brace and prevent twisting of the outer ends of the side frame channels carrying the extensions with which the rear ends of the springs for supporting the vehicle body are connected. As previously stated the wheel support or carrier is pivotally mounted upon the transverse bar 23 so that the carrier may be swung downwardly to permit of the application of a spare wheel upon the hub receiving portion 30 of the carrier, said swinging movement being permitted by unscrewing the rod 34 from the bracket 35 which normally holds the carrier in an upright position. The supporting uprights 25 of the carrier, at their lower ends, are provided with removable bearing portions 38 which are connected with the upper bearing portions preferably by means of the bolts 39 as indicated in Figure II, although if desired these bearings may be cast integral with the uprights 25 and the tie bar 23 inserted therethrough before being applied between the side frame members 10.

While we have shown a wheel carrier mounted upon the transverse frame bar 23 it will be understood that a tire carrier may be substituted therefor as provided for in our copending application, Serial No. 172,720 filed June 4, 1917.

It will be apparent to those skilled in the art that the invention shown and described herein is susceptible of various modifications, embodiments and arrangements to suit special or varying conditions and we wish it to be understood that the terms which we have used are merely descriptive and not limiting and that it is our intention to include any and all modifications which fall within the scope of the invention as defined in the appended claims.

What we claim as new and wish to secure by Letters Patent is:

1. In a device of the class described, a vehicle frame having longitudinally extending side members, a transverse bar disposed between said side members and means forming a support for the bar and connecting it with the frame, a portion of said means being mounted for removal independently of the frame to permit the bar to be removed therefrom.

2. In a device of the class described, a vehicle frame having longitudinally extending side members, a removable transverse bar disposed between said side members, two part sockets for the ends of said bar, each comprising two substantially half round members, removable means connecting said half round members and means connecting one of said half round members with said frame.

3. In a device of the class described, a vehicle frame having longitudinally extending side members, a transverse bar disposed between said side members, and means connecting each end of the bar with said side members, a portion of said connecting means being removably connected with the remaining portion thereof independently of the side frame members to permit removal of said bar from said frame.

4. In a device of the class described, a vehicle frame having longitudinally extending side members, a transverse bar removably disposed between said side members and means adapted to support the bar comprising separable portions removably connected together, one of which is connected with the frame.

5. In a device of the class described, a vehicle frame having longitudinally extending side members, a transverse bar disposed between said side frame members and sockets at each end of said bar adapted to connect it with the frame, said sockets each comprising a relatively fixed part and a removable part to permit removal of said transverse bar from the frame.

6. In a device of the class described, a vehicle frame having longitudinally extending side members, a transverse bar disposed between said side frame members, socket members for each end of the bar having removable portions to permit removal of the bar from the frame, a key upon the bar disposed within a recess formed in the socket whereby the bar is prevented from turning and means connecting said socket members to said frame members.

7. In a device of the class described, a vehicle frame having longitudinally extending side members, a transverse bar disposed between said side frame members, keys positioned within slots formed in the ends of said bar and projecting laterally therefrom, brackets connected with said frame members and engaging the ends of said bar on one side thereof, retaining members for the bar having recesses adapted to receive the ends of said keys and means removably connecting said retaining members with said brackets and permitting removal of the bar from the bracket without removing the latter.

8. In a device of the class described, a vehicle frame having longitudinally extending side members, a transverse bar disposed between said side members, sockets at each end of the bar adapted to connect it with the frame, said sockets each comprising a fixed portion and a removable portion connected therewith to permit removal of the bar and means adapted to prevent the turning of the bar within said sockets.

9. In a device of the class described, a vehicle frame having longitudinally extending side members, a transverse bar disposed between said side members, sockets at each end of the bar adapted to connect it with the frame, said sockets each comprising two portions, one of which is removable and means disposed within the sockets in engagement with the bar to prevent turning of the same.

10. In a device of the class described, a vehicle frame having longitudinally extending side members, a transverse bar disposed between said side members having projections extending laterally from the ends thereof, two part sockets for the ends of said bar having recesses adapted to receive said projections, removable means connecting the two parts of the socket and separate means connecting one part of each socket with said frame members.

11. In a device of the class described, a vehicle frame having longitudinally extending side members, a removable transverse bar disposed between said side members, two part sockets for the ends of said bar, means removably connecting the two parts of each of the sockets, means connecting one part of each of the sockets with said frame and means serving to prevent the turning of the bar within said sockets.

12. In a device of the class described, a vehicle frame having longitudinally extending side members, a transverse bar disposed between said side members, means connecting the ends of the bar with said side members, a portion of said connecting means being removable to permit removal of the bar from the frame, and means adapted to prevent the turning of the bar upon said connecting means.

13. In a device of the class described, a vehicle frame having longitudinally extending side members, a transverse bar disposed between said side members, means adapted to removably support the bar comprising separable portions removably connected together, one of which is connected with the frame and means serving to prevent the turning of the bar upon said supporting means.

14. In a device of the class described, the combination of channel shaped side bars, extensions connected at the rear ends of said side bars and disposed between the sides of said channels, said extensions being provided with flanges at the edges thereof, and with half round sockets, a brace rod removably disposed at each end in one of said half round sockets and provided with a diametrical slot at each end thereof, bolts connecting said extensions to said side bars, keys disposed in the slots at the ends of said connecting rod and a retaining piece secured to each socket and engaging said key to hold it in position to said slot and to prevent said connecting rod from twisting or turning relative to said extensions.

15. In a device of the class described, a vehicle frame having longitudinally extending side channels, channel shaped extensions mounted upon said side channels with their flanges turned inwardly, a transverse bar disposed between said extensions, two part socket members for the ends of said bar, disposed within said channel shaped extensions, and means removably connecting one part of each of the said socket members to the remaining part to permit removal of said bar.

16. In a device of the class described, a vehicle frame having longitudinally extending side members, a transverse bar removably connected with said side frame members, a tire support pivoted upon said bar and means removably connecting said tire support with said frame members.

17. In a device of the class described, a vehicle frame having longitudinally extending side members, a pair of transverse connecting bars disposed between said side members, one of which is removable and the other permanently connected therewith, a tire carrier mounted upon said removable bar, and means removably connecting said tire carrier with said permanently connected bar.

18. In a device of the class described, a vehicle frame having longitudinally extending side members, a removable transverse bar connecting said side members, uprights carried by said removable bar and hub receiving portions connected with said uprights for supporting a pair of wheels.

19. In a device of the class described, a vehicle frame having longitudinally extending side members, a front connecting bar disposed between said side members, a rear bar disposed between said side members and removably connected therewith, uprights carried by said removable bar, tire carrying means mounted upon said uprights and means removably connecting said last mentioned means with said front connecting bar.

20. In an automotive vehicle having a pair of longitudinal frame members, extension members secured to corresponding ends of said frame members adapted to be connected to the vehicle springs, a transverse rod, means integral with said extension members for engaging one side of said rod and means detachably secured to said first means for engaging the other side of said rod.

In testimony whereof, we affix our signatures.

EDWARD H. BELDEN.
HARRY E. RHOADS.